US006392843B1

(12) United States Patent
Murphy

(10) Patent No.: US 6,392,843 B1
(45) Date of Patent: May 21, 2002

(54) LOCKING HINGE ANTI-SHOCK DISC DRIVE SUSPENSION

(75) Inventor: James Morgan Murphy, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/358,045

(22) Filed: Jul. 21, 1999

Related U.S. Application Data
(60) Provisional application No. 60/093,736, filed on Jul. 21, 1998.

(51) Int. Cl.$^7$ ................................................ G11B 21/16
(52) U.S. Cl. .................................. 360/245.3; 360/244.8
(58) Field of Search ........................... 360/245.3, 244.3, 360/244.8, 244.9

(56) References Cited

U.S. PATENT DOCUMENTS

| | | | |
|---|---|---|---|
| 4,734,805 A | * 3/1988 | Yamada et al. | 360/244.8 |
| 5,012,369 A | * 4/1991 | Owe et al. | 360/244.8 |
| 5,065,268 A | * 11/1991 | Hagen | 360/244.8 |
| 5,446,612 A | * 8/1995 | Thornton et al. | 360/244.9 |
| 5,712,748 A | 1/1998 | Masse | |
| 5,774,305 A | 6/1998 | Boutaghou | |
| 5,781,378 A | 7/1998 | Heitkamp et al. | |
| 5,793,569 A | 8/1998 | Christianson et al. | |
| 5,796,556 A | 8/1998 | Boutaghou | |
| 5,805,381 A | 9/1998 | Resh | |
| 5,825,589 A | * 10/1998 | Khan | 360/245.3 |
| 5,831,793 A | 11/1998 | Resh | |
| 5,850,320 A | 12/1998 | Warmka et al. | |
| 5,856,896 A | 1/1999 | Berg et al. | |
| 5,877,920 A | 3/1999 | Resh | |
| 5,877,921 A | 3/1999 | Coon et al. | |
| 5,892,637 A | 4/1999 | Brooks, Jr. et al. | |
| 5,896,246 A | 4/1999 | Budde et al. | |
| 5,898,543 A | * 4/1999 | Jagt et al. | 360/244.8 |
| 5,914,835 A | * 6/1999 | Girard et al. | 360/244.8 |
| 5,936,803 A | * 8/1999 | Berding | 360/244.9 |
| 6,046,884 A | * 4/2000 | Crane | 360/244.8 |
| 6,104,572 A | * 8/2000 | Williams et al. | 360/244.8 |

* cited by examiner

*Primary Examiner*—Allen Cao
(74) *Attorney, Agent, or Firm*—John B. Phillips; Merchant & Gould P.C.

(57) ABSTRACT

A suspension for connecting a slider to an actuator arm of a disc drive and for maintaining the slider substantially engaged with a disc surface positioned below the suspension incorporates a load beam defining a first bend region adjacent a proximal end of the load beam and a second bend region adjacent a distal end of the load beam. An overlapping member attached to a top surface of the load beam has a first segment fixed to the load beam on one side of the second bend region and a second segment that engages the load beam on the other side of the second bend region when the distal end of the load beam is placed under a load in the absence of a shock event. The second segment of the overlapping member disengages from the surface of the load beam during a shock event to allow the second bend region to help absorb the shock and maintain the slider engaged with the disc surface.

22 Claims, 12 Drawing Sheets

LOCKING HINGE ANTI-SHOCK DISC DRIVE SUSPENSION

RELATED APPLICATIONS

This application claims the benefit of U.S. Provisional Application No. 60/093,736, entitled LOCKING HINGE ANTI-SHOCK SUSPENSION, filed Jul. 21, 1998.

FIELD OF THE INVENTION

The present invention relates to disc drive storage devices. More particularly, the present invention relates to a head suspension assembly that provides enhanced shock protection to the head by increasing the shock threshold required to separate the head from the surface of the disc.

BACKGROUND OF THE INVENTION

FIG. 1 illustrates a typical computer disc drive 20 that includes one or more discs 22 mounted on a hub 24 for rotation about a spindle shaft 25. The discs 22 are typically coated with a magnetic medium for storage of digital information in a plurality of circular, concentric data tracks. A spindle motor rotates the hub 24 and the attached discs 22 about the shaft 25 to allow a head or "slider" 26 carrying electromagnetic transducers to pass over each disc surface and read information from or write information to the data tracks.

The slider 26 is typically formed from a ceramic block having a specially etched air bearing surface that forms an air cushion or "bearing" as the disc rotates beneath the slider. The hydrodynamic lifting force provided by the air bearing surface causes the slider 26 to lift off and "fly" a very small distance above the surface of the disc 22 as the disc spins up to its operating speed. Although the fly height of the slider 26 is only a fraction of a micron, this thin film of air between the slider 26 and the disc 22 prevents damage to the fragile magnetic coating on the surface of the disc.

The slider 26 is preferably moved between data tracks across the surface of the disc 22 by an actuator mechanism 28 such as a rotary voice coil motor. The actuator 28 includes arms 30 (FIGS. 1 and 2) attached to each of the sliders 26 by flexible suspensions 32. Each suspension 32 essentially comprises a flat sheet metal spring that exerts a controlled preload force on the slider 26 in the vertical direction (i.e., against the surface of the disc 22 as shown in FIG. 2). The preload force supplied by the suspension 32 effectively counters the hydrodynamic force generated by the slider 26 and prevents the slider from flying too far off the surface of the disc 22. Although relatively flexible in the vertical direction, the suspension 32 is relatively stiff in the lateral direction in order to provide for precise lateral positioning of the slider 26 over the closely spaced data tracks.

The suspension 32 typically includes a relatively stiff load beam 34 (FIGS. 2 and 3) and a relatively flexible gimbal 36 (FIG. 3) for attaching the slider 26. A first or proximal end 38 (FIG. 2) of the load beam 34 is attached to the arm 30 of the rotary actuator 28, and a relatively flexible region 40 of the load beam 34 adjacent the actuator arm 30 is typically bent downward toward the surface of the disc 22 to supply the aforementioned preload force. A second or distal end 42 (FIG. 3) of the load beam 34 opposite the actuator arm 30 is attached (such as by welding or by an adhesive) to the more flexible gimbal 36 which, in turn, is fixed to the slider 26. An end of the gimbal 36 includes a cutout region defining two parallel flexure beams 44 and a cross member 45 defining an attachment pad 46. A tongue 47 of the load beam 34 typically protrudes within the cutout region of the gimbal 36 so that a dimple (not shown) on the bottom of the tongue 47 may contact a top surface 48 of the slider 26 to transfer the preload force directly to the slider 26. The attachment pad 46 of the gimbal 36 is secured to the top surface 48 of the slider, such as by an adhesive, so that the flexure beams 44 provide a resilient connection between the slider 26 and the relatively stiff load beam 34. The resilient connection provided by the gimbal 36 is important to allow the slider 26 to pitch and roll (i.e., "gimbal") while following the topography of the rotating disc 22.

Although the preload supplied by the load beam 34 is effectively countered by the hydrodynamic force generated by the slider 26 during rotation of the disc 22, that same preload force typically forces the slider 26 to rest on the surface of the disc 22 once the disc stops spinning and the hydrodynamic force dissipates (e.g., when the disc drive 20 is powered down). During these periods of inactivity, and particularly during assembly, shipping and handling of the disc drive 20 before the drive is assembled within a computer, the fragile magnetic coating on the surface of the disc 22 is susceptible to damage from accidental vertical displacement of the slider 26, such as by a shock event.

Vertical displacement of the slider 26 may occur when a disc drive 20 is subjected to a shock of sufficient magnitude to cause the actuator arm 30 and the attached suspension 32 to move away from the disc surface (either on the initial shock or on a rebound from the initial shock). Although the bend region 40 in the load beam 34 and the resilient nature of the gimbal 36 tend to hold the slider 26 against the disc surface even as the actuator arm 30 moves away from the disc 22, a sufficiently large shock (e.g., a shock 200 times the acceleration of gravity or 200 "Gs") will typically overcome the preload force and cause the slider 26 to be pulled off the disc surface. The return impact of the slider 26 against the disc surface can cause severe damage to the thin magnetic coating on the surface of the disc. If the shock event occurs during operation of the disc drive, the damage to the disc coating may create an unusable portion or sector of the disc and a potential loss of data stored on that portion of the disc. However, most large shock events typically occur during periods of inactivity, as described above, when the slider 26 is positioned along an inner radial portion or "landing region" of the disc 22 not used for data storage. Regardless of whether the impact occurs in the data region or the landing region of the disc 22, the impact typically generates debris particles that can migrate across the surface of the disc 22 and interfere with the air bearing surface of the slider 26, thereby causing damage to more vital regions of the disc 22 during disc operation and possibly leading to a disc "crash."

Previous efforts to minimize the above described "head slap" phenomenon have focused on reducing the mass of the suspension 32 between the bend region 40 and the head or slider 26. Due to the resiliency of the bend region 40 of the load beam 34, it is primarily the mass of the end portion of the suspension 32 distal to the bend region 40 that determines the lifting force applied to the slider 26 during a shock event. That is, if the force tending to pull the head or slider 26 off the disc surface—as measured by the acceleration of the shock event (the number of Gs) multiplied by the combined mass of the slider 26 and the portion of the suspension 32 distal to the bend region 40—is greater than the preload force applied by the load beam 34, then the slider 26 will separate from the disc surface resulting in a "head slap" as described above.

Therefore, a reduction in the mass of the suspension 32 distal to the bend region 40 leads to a reduction in the force applied to the slider 26 during a shock event and thus to improved shock performance for the disc drive 20.

However, reducing the mass of the suspension 32 typically leads to further problems and design compromises. For example, the typical method for reducing the mass of the suspension 32 entails shortening the portion of the suspension between the bend region 40 and the slider 26. However, shortening the suspension tends to increase the variation in the preload force applied by the suspension since the shorter suspension can not typically accommodate variations in the bend angle of the load beam 34 at the bend region 40. In other words, longer suspensions 32 provide lower variations in the preload force resulting from manufacturing tolerances in the bend region 40, while shorter suspensions trade enhanced shock performance for higher variations in the preload force due to these same manufacturing tolerances in the bend angle at the bend region 40. Due to the requirement for careful balancing of the preload force against the hydrodynamic force created by the slider 26, any significant variation of the preload force may cause damage to the fragile surface of the disc 22.

It is with respect to these and other background considerations, limitations and problems that the present invention has evolved.

SUMMARY OF THE INVENTION

The present invention relates to a disc drive assembly having a suspension that provides enhanced shock protection to the head or "slider" of each disc by increasing the shock threshold required to separate the slider from the surface of the disc.

In accordance with one embodiment of the present invention, a suspension is provided for connecting a slider to an actuator arm of a disc drive. The suspension is adapted to maintain the slider substantially engaged with a disc surface positioned below the suspension. The suspension includes a load beam defining a first bend region adjacent a proximal end of the load beam and a second bend region adjacent a distal end of the load beam. The suspension also includes an overlapping member attached to a top surface of the load beam. The overlapping member has a first segment fixed to the load beam on one side of the second bend region and a second segment that extends over the second bend region to releasably engage the load beam on the other side of the second bend region when the distal end of the load beam is placed under a predetermined operating load.

In one embodiment of the present invention, the overlapping member comprises a gimbal adapted to attach the slider. The first segment of the overlapping gimbal is fixed to a distal portion of the load beam so that the second segment of the overlapping gimbal releasably engages a proximal portion of the load beam between the first and second bend regions.

In another embodiment of the present invention, the overlapping member is separate from a gimbal that is fixed to the distal end of the load beam for securing the slider. The first segment of the overlapping member is thus fixed to a proximal portion of the load beam between the first and second bend regions so that the second segment of the overlapping member releasably engages a distal portion of the load beam.

The present invention can also be implemented as a disc drive assembly having at least one disc mounted on a hub for rotation about a spindle shaft and an actuator for moving an actuator arm above the surface of the disc. A suspension connects a slider to the actuator arm to maintain the slider substantially engaged with the disc surface. The suspension includes a load beam having a proximal end attached to the actuator arm and a distal end engaging the slider. The load beam defines a first bend region adjacent the proximal end and a second bend region adjacent the distal end of the load beam. The suspension includes an overlapping member having a first segment fixed to the load beam on one side of the second bend region and a second segment that extends over the second bend region to releasably engage the load beam on the other side of the second bend region when the distal end of the load beam is placed under a predetermined operating load.

The present invention can also be implemented as a suspension for connecting a slider to an actuator arm of a disc drive. The suspension includes a load beam defining first and second bend regions, a proximal portion between the first and second bend regions, and a distal portion distal to the second bend region. The first and second bend regions are each preloaded to urge the distal portion of the load beam downward, the preload force of the first bend region being larger than the preload force of the second bend region. An overlapping member has a first segment fixed to the load beam on one side of the second bend region and a second segment extending over the second bend region to releasably engage the load beam on an opposite side of the second bend region when the distal end of the load beam is placed under a load that is greater than the preload force provided by the second bend region.

The present invention can further be implemented as a suspension assembly for supporting a slider within a disc drive. The suspension assembly includes a load beam having a distal end adapted to attach the slider and a bend region urging the distal end downward. The load beam further includes an intermediate locking hinge positioned between the bend region and the distal end for substantially isolating the distal end and the attached slider from upward movement of the load beam.

The present invention can further be implemented as a disc drive assembly having a slider engaging a surface of a disc and means for increasing a shock threshold required to separate the slider from the disc surface.

These and various other features as well as advantages which characterize the present invention will be apparent from a reading of the following detailed description and a review of the associated drawings.

DETAILED DESCRIPTION OF THE PREFERRED EMBODIMENTS

Figure 1:
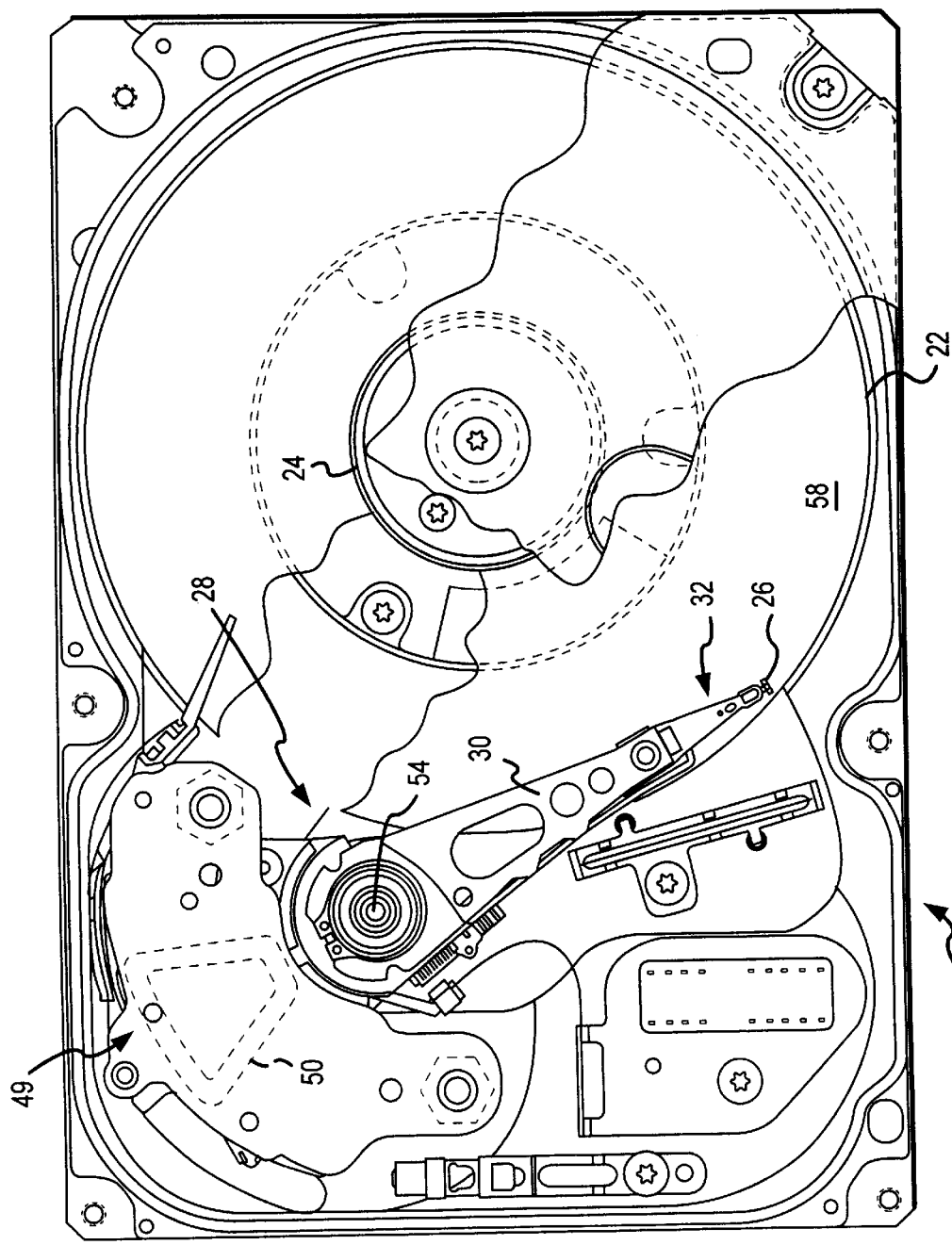
FIG. 1 is a top plan view of a disc drive in which the present invention is beneficially utilized.
Figure 2:
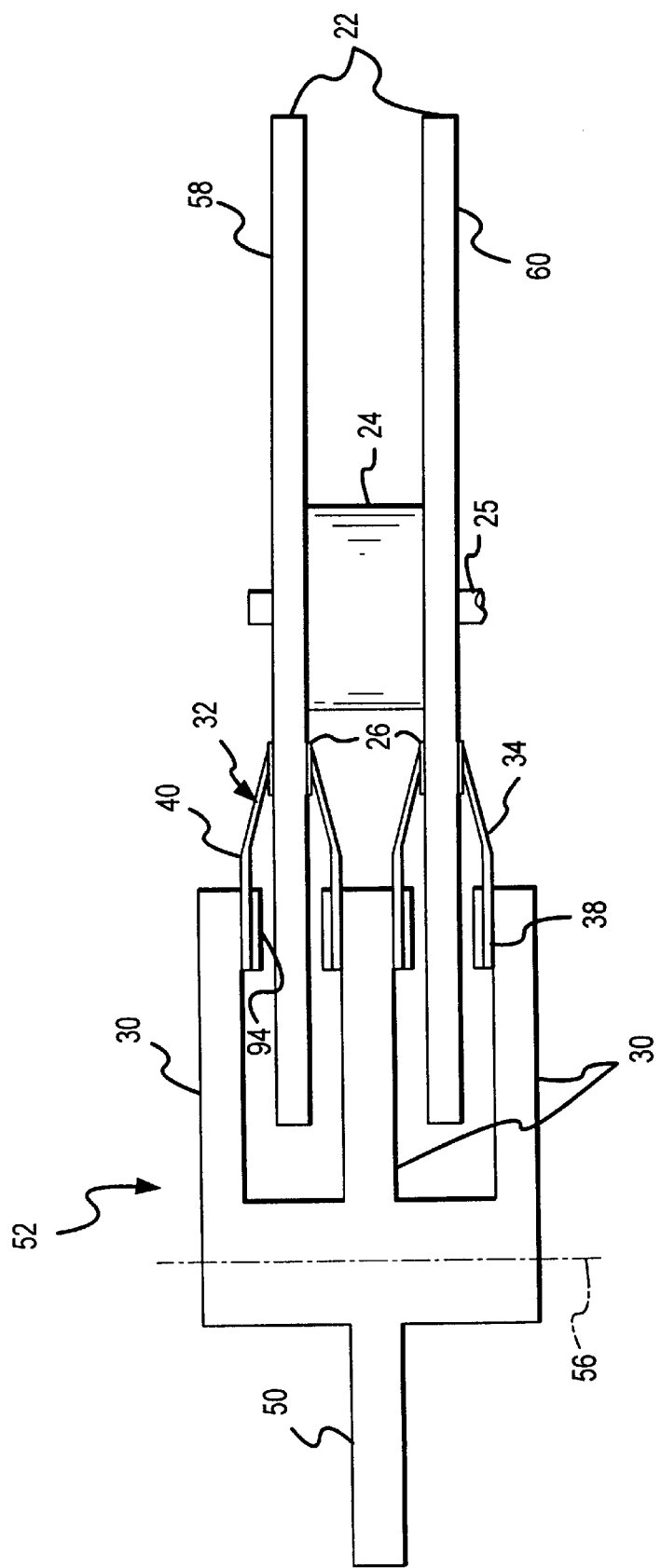
FIG. 2 is an elevated side view of two discs within the disc drive shown in FIG. 1, illustrating prior art suspensions connecting read/write heads or "sliders" to the arms of a rotary actuator.

The disc drive 20 illustrated in FIG. 1 includes a rotary actuator 28 for moving a head or "slider" 26 across the surface of a disc 22. The actuator 28 utilizes a voice coil motor 49 having a voice coil 50 that moves laterally within a magnetic field in response to electrical signals sent to the coil 50. The coil 50 is secured to one side of an E-block 52 (FIG. 2) for rotation about a pivot shaft 54 (FIG. 1) centered on a vertical axis 56, as best shown in FIG. 2. The opposite side of the E-block 52 includes a plurality of parallel, spaced-apart actuator arms 30 (FIG. 2). The top and bottom actuator arms 30 each attach a single suspension 32 for holding a slider 26 against the top and bottom surface (58 and 60) of their respective discs 22, while one or more intermediate actuator arms 30 attach two separate suspensions 32 to the bottom surface 60 of one disc 22 and the top surface 58 of another disc 22. Thus, movement of the voice coil 50 causes rotation of the E-block 52 about the axis 56 and movement of the sliders 26 over the surfaces 58 and 60 of the discs 22. Although several embodiments of the present invention are preferably described below with respect to the rotary voice coil motor 49, it is understood that the present invention may be used with any other type of actuator commonly utilized in disc drives, such as a linear actuator (not shown). Furthermore, while two discs 22 and four prior art suspensions 32 are shown in FIG. 2, the remainder of the description will address only a single disc surface such as the top surface 58 of one of the discs 22 shown in FIG. 2.

Figure 3:
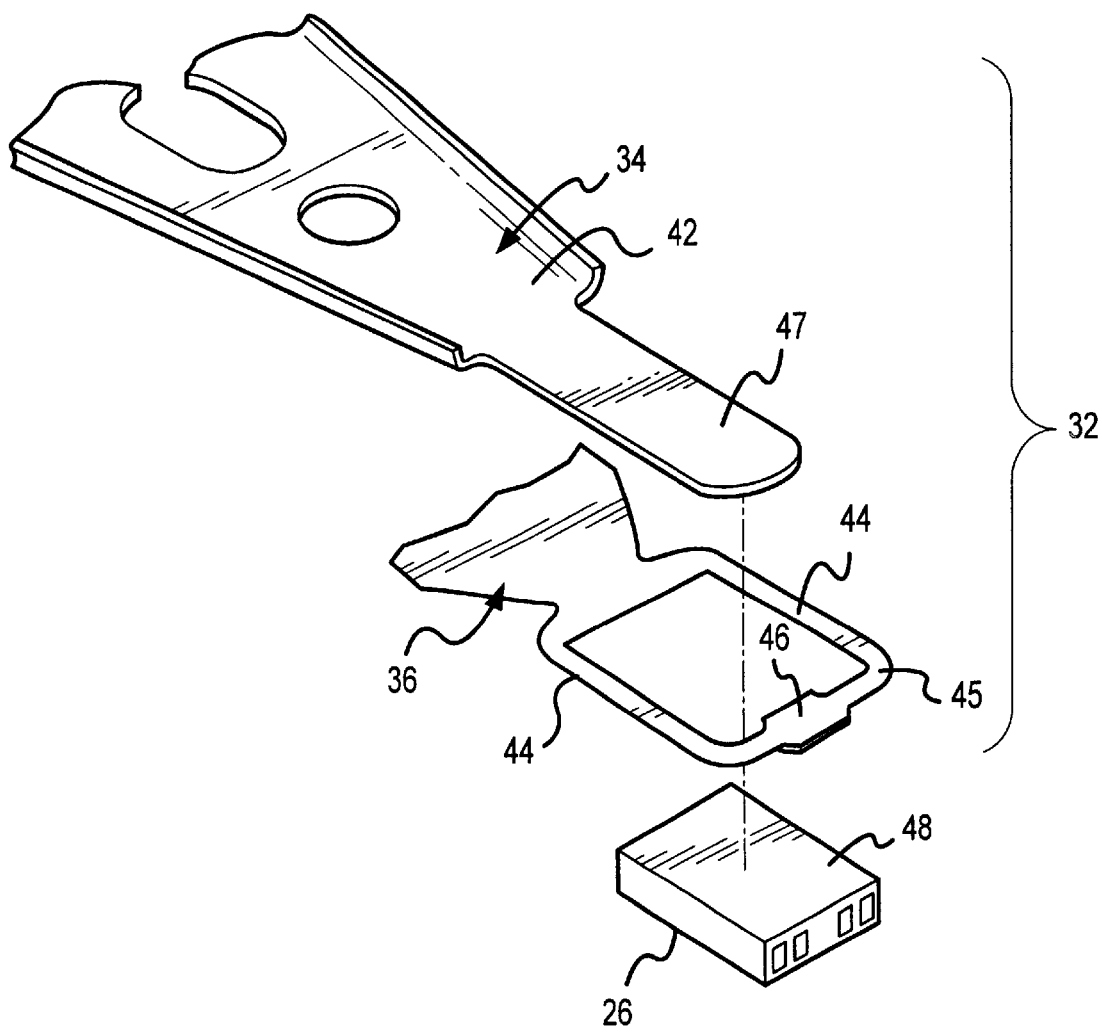
FIG. 3 is an enlarged, isometric, exploded view of a prior art suspension illustrating the connection of a prior art load beam and gimbal to a slider.
Figure 4:
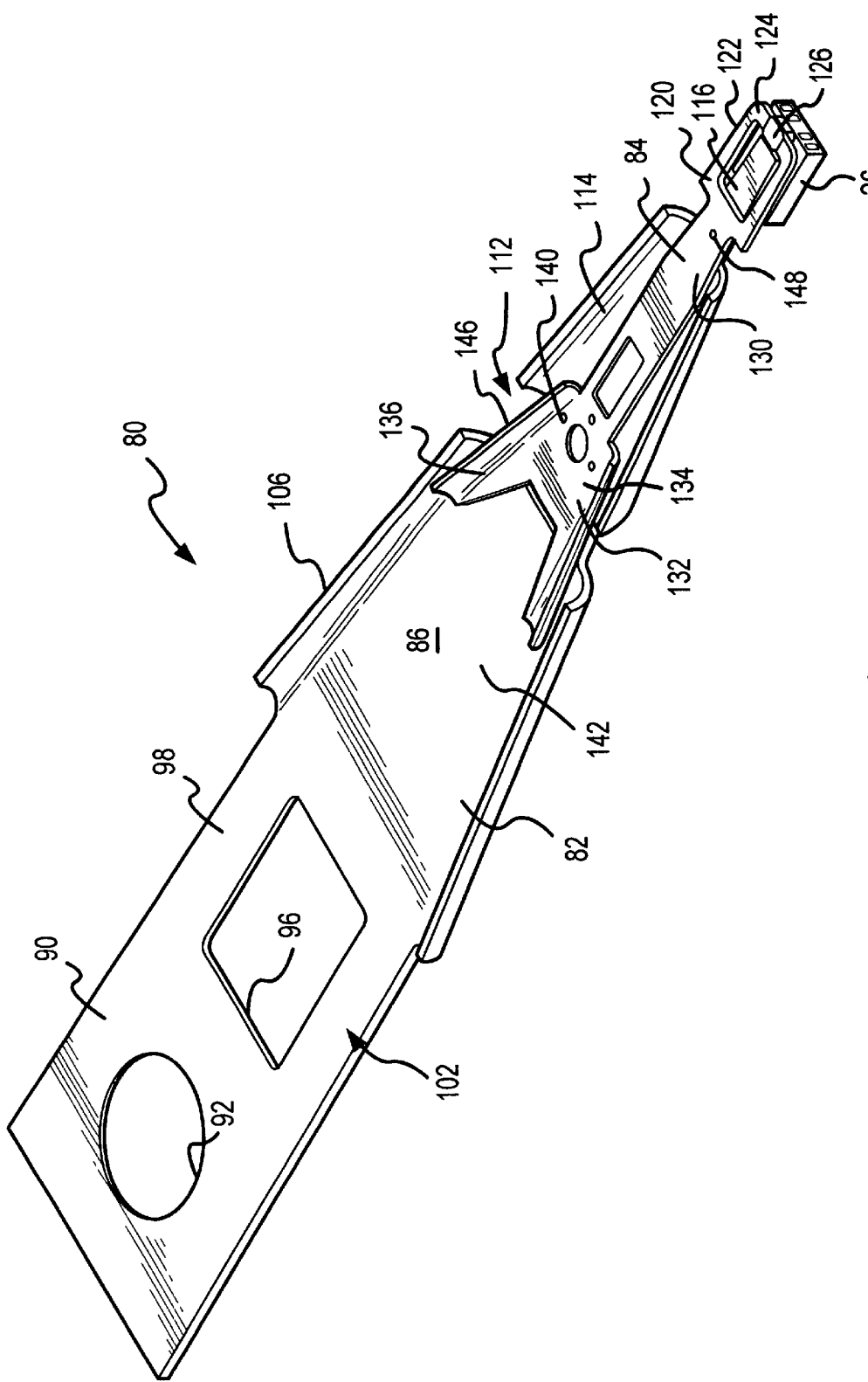
FIG. 4 is an isometric view of a locking hinge suspension in accordance with a preferred embodiment of the present invention.
Figure 5:
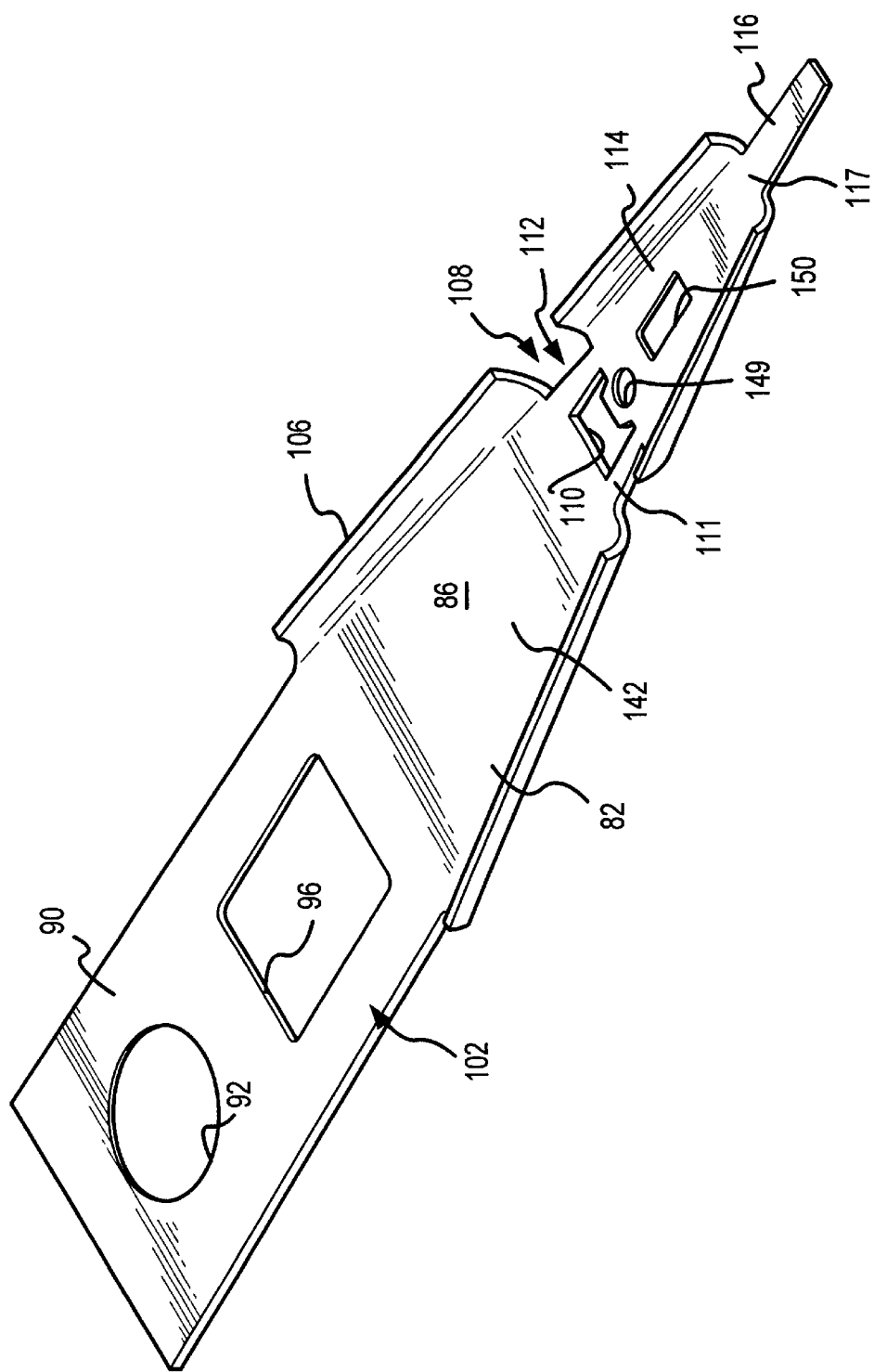
FIG. 5 is an isometric view of a load beam of the locking hinge suspension shown in FIG. 4.
Figure 6:
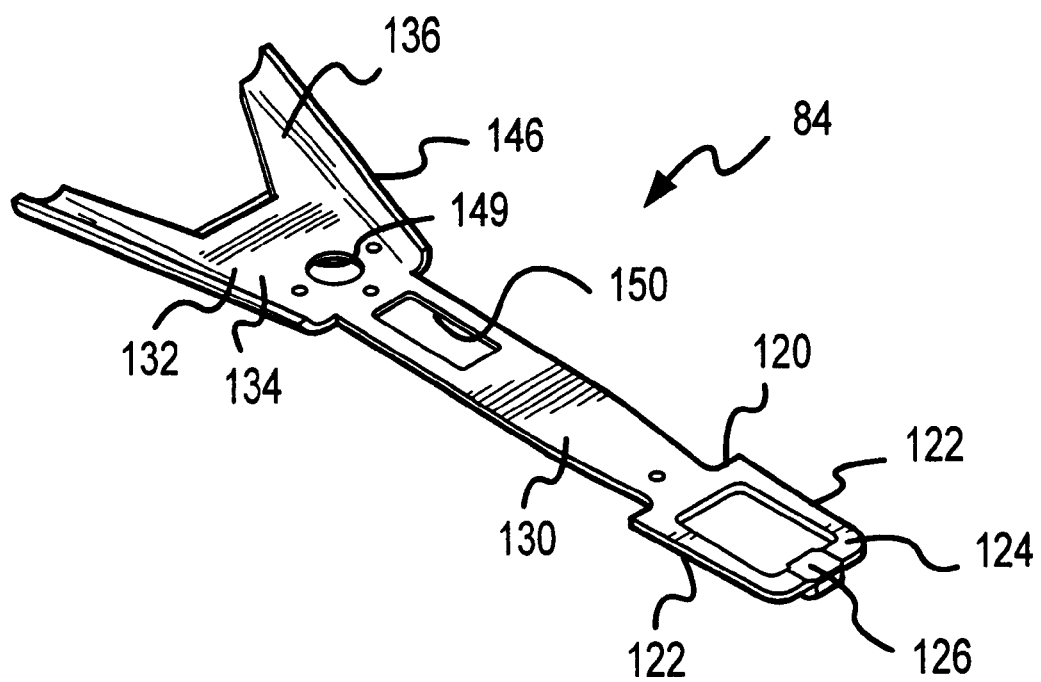
FIG. 6 is an isometric view of a gimbal of the locking hinge suspension shown in FIG. 4.

FIG. 4 illustrates one preferred embodiment of the locking hinge, anti-shock suspension 80 of the present invention. The suspension 80 differs from the prior art suspension 32 (FIG. 3) in the design of both the load beam 82 (FIG. 5) and the gimbal 84 (FIG. 6). FIG. 4 also illustrates that the gimbal 84 is attached to a top surface 86 of the load beam 82 as opposed to the underside of the load beam such as with the prior art suspension 32 (FIG. 3). FIG. 4 further shows the attachment between the gimbal 84 and the slider 26. As described in greater detail below, one advantage of the embodiment of the present invention shown in FIG. 4 is that the suspension 80 may be substituted for the prior art suspension 32 without requiring any additional components and without requiring any change in the design of the slider 26.

The load beam 82 (FIG. 5) comprises a metal sheet having a nominal thickness of approximately 2.5 thousandths of an inch ("mils"). A first or proximal end 90 of the load beam 82 includes a circular hole 92 for attaching the load beam 82 to the end of the actuator arm 30 of the E-block 52 (FIG. 2). A base plate 94 (FIGS. 2 and 7–9) secures the load beam 82 to the actuator arm 30 to ensure that the relatively stiff load beam 82 moves together with the actuator 28. FIG. 5 further illustrates an opening 96 formed adjacent the proximal end 90 of the load beam 82. The opening 96 defines two relatively narrow spring elements 98 that may be bent downward to provide a predetermined preload force to the remainder of the load beam 82. The relatively flexible spring elements 98 and the opening 96 thus comprise a first bend region 102 comparable to the bend region 40 (FIG. 2) of the prior art suspension 32, and the portion of the load beam 82 extending distally from the first bend region 102 transfers the preload force to the slider 26.

The load beam 82 also includes vertical rails 106 extending distally from the first bend region 102 along the side edges of the load beam 82 to enhance the stiffness of the load beam 82 in the vertical direction. A gap 108 in the vertical rails 106, together with an opening 110 (FIG. 5) defined in the surface of the load beam 82, defines two additional narrow spring elements 111 which, in turn, define a second bend region 112 in the load beam 82. The second bend region 112 is typically bent downward to provide an additional preload force to a distal portion 114 of the load beam 82, as described in greater detail below. The vertical stiffening rails 106 terminate at a tongue 116 at a distal end 117 of the load beam 82, and a dimple or etched post 118 (FIGS. 7–9) is preferably fabricated on the underside of the tongue 116 for applying the preload force from the first bend region 102 directly to the slider 26, as described in greater detail below.

FIG. 6 illustrates one preferred embodiment of the gimbal 84 of the present invention. A distal portion 120 of the gimbal 84 includes a cutout defining flexure beams 122, a cross member 124, and an attachment pad 126 similar to the prior art gimbal 36 (FIG. 3). The gimbal 84 is formed from a relatively thin metal sheet having a nominal thickness of approximately 0.5 mils. Thus, the relatively thin flexure beams 122 allow the slider 26 to follow the pitching and rolling motions of the disc 22 once the slider is attached to the pad 126.

The gimbal 84 includes a bridge portion 130 (FIG. 6) that connects the distal portion 120 of the gimbal 84 to an overlapping extension 132 having a body 134 and two arms 136 extending proximally from the body 134. The gimbal 84 is preferably attached (such as by welding) to the top surface 86 of the load beam 82, as shown in FIG. 4, so that the arms 136 of the gimbal extension 132 overlie the narrow spring elements 111 defining the second bend region 112. Furthermore, only the body 134 of the gimbal extension 132 is preferably attached (such as at weld points 140) to the distal portion 114 of the load beam as shown in FIG. 4 so that the arms 136 of the gimbal extension 132 are not fixed to the load beam 82 but rather engage a proximal portion 142 of the load beam 82 (between the two bend regions 102 and 112) when the distal portion 114 of the load beam is placed under a load that exceeds the preload force provided by the second bend region 112 (i.e., when there is no bend in the second bend region 112). In this manner, the gimbal extension 132 acts like a locking hinge that provides a vertically stiff beam between the first bend region 102 and the distal end 117 of the load beam 82 under normal operating conditions when the distal end 117 is exposed to a predetermined operating load. However, the gimbal extension 132 also "unlocks" from the second bend region 112 as necessary to help absorb shocks as described below with reference to FIGS. 7–9.

The gimbal 84 (FIGS. 4 and 6) preferably includes vertical stiffening rails 146 along the sides of the gimbal extension 132 to increase the stiffness of the locking hinge. The distal portion 120 of the gimbal 84 performs similarly to prior art gimbals (such as the gimbal 36 in FIG. 3) in its capacity for attaching the slider 26. FIG. 4 illustrates that the bridge portion 130 of the gimbal 84 is preferably welded (such as at weld spot 148) to the distal end 117 of the load beam 82 at a base of the tongue 116 so that the end of the tongue 116 extends below the open distal portion 120 of the gimbal 84 for contacting the top surface 48 of the slider 26. A dimple or etched post 118 (FIGS. 7–9) on the underside of the tongue 116 preferably contacts the top surface 48 of the slider 26 to enhance the gimbal motion of the slider 26 as it flies over the disc 22. The attachment pad 126 at the distal end of the gimbal 84 is also fixed to the top surface 48 of the slider 26 as described above and as shown in FIG. 4.

Thus, the gimbal 84 includes both a traditional distal portion 120 for contacting the slider 26 as well as a stiffened extension 132 for overlapping and thereby locking the second bend region 112 of the load beam 82. In order to ensure proper alignment between the gimbal 84 and the load beam 82 prior to welding these parts together, both the gimbal 84 and the load beam 82 preferably contain matching registration openings 149 and 150 (FIGS. 4–6).

Figure 7:
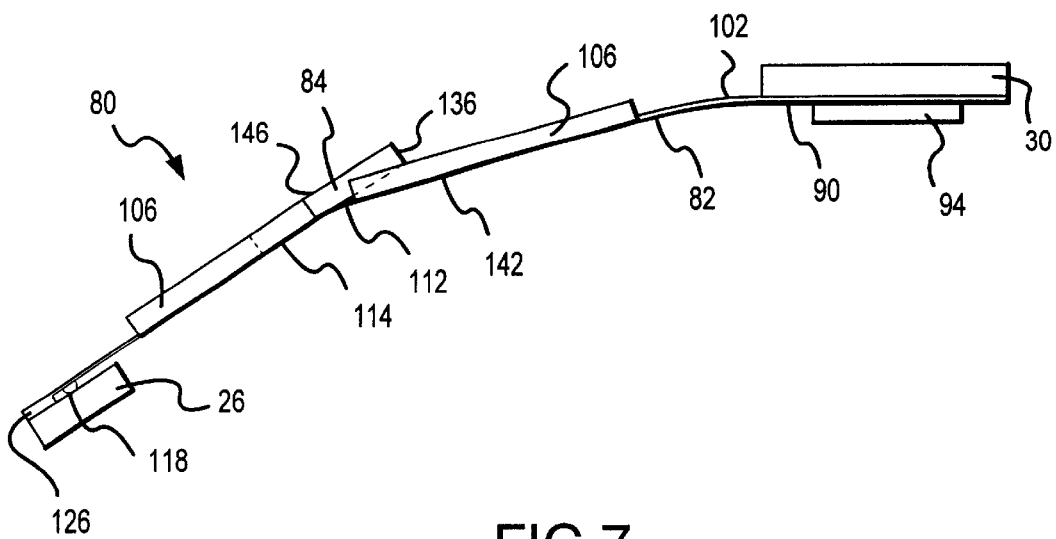
FIG. 7 is an elevated side view of the locking hinge suspension shown in FIG. 4 attached to an actuator arm of the disc drive shown in FIG. 1 illustrating an unloaded position of the locking hinge suspension with an exaggerated vertical scale.

FIG. 7 illustrates an unloaded suspension 80 where the proximal end 90 of the load beam 82 is attached to an actuator arm 30 by a base plate 94. FIG. 7 clearly shows (with a greatly exaggerated vertical scale) the two bend regions 102 and 112. The first bend region 102 supplies the preload force to the slider 26 while the preload force provided by the second bend region 112 tends to uncouple the distal portion 114 of the load beam 82 from the proximal portion 142 so that the mass of the proximal portion 142 of the load beam 82 (between the two bend regions 102 and 112) will not contribute to pulling the slider 26 upward during a shock event. Thus, the arms 136 of the gimbal extension 132 are disengaged from the top surface 86 of the load beam in the unloaded condition shown in FIG. 7.

Figure 8:
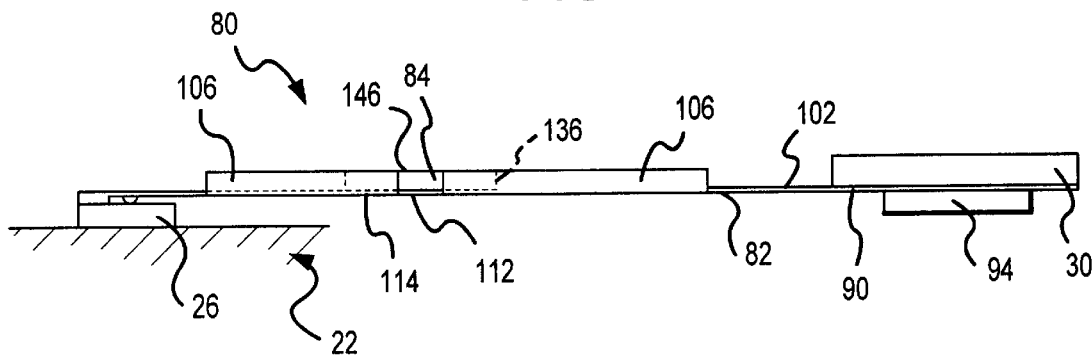
FIG. 8 is an elevated side view similar to FIG. 7 illustrating a disc loaded below the locking hinge suspension to contact the slider at a distal end of the locking hinge suspension.

FIG. 8 illustrates the suspension 80 in a normal loaded condition (such as during operation of the disc drive 20) where the slider 26 either rests directly on the top surface 58 of a static disc 22 or is flying slightly above the top surface 58 of a spinning disc 22. FIG. 8 thus illustrates the closed or locked position of the locking hinge created when the second bend region 112 is straightened out and the arms 136 of the gimbal extension 132 engage the top surface 86 of the load beam 82. It is important to note that the preload force provided by the second bend region 112 is less than the preload force of the first bend region 102 (i.e., the first bend region 102 is stiffer than the second bend region 112) so that the locking hinge closes when the slider 26 is placed in contact with the disc surface 58. That is, the larger preload force provided by the first bend region 102 tends to close the locking hinge against the smaller preload force of the second bend region 112 to form a rigid linkage between the proximal and distal portions 142 and 114, respectively. This rigid linkage is then subjected to the preload force applied by the first bend region 102 (i.e., the predetermined operating load). Thus, FIG. 8 illustrates that the locking hinge suspension 80 of the present invention acts like a traditional suspension (e.g., the suspension 32 in FIGS. 2 and 3) during normal operation of the disc drive 20.

Figure 9:
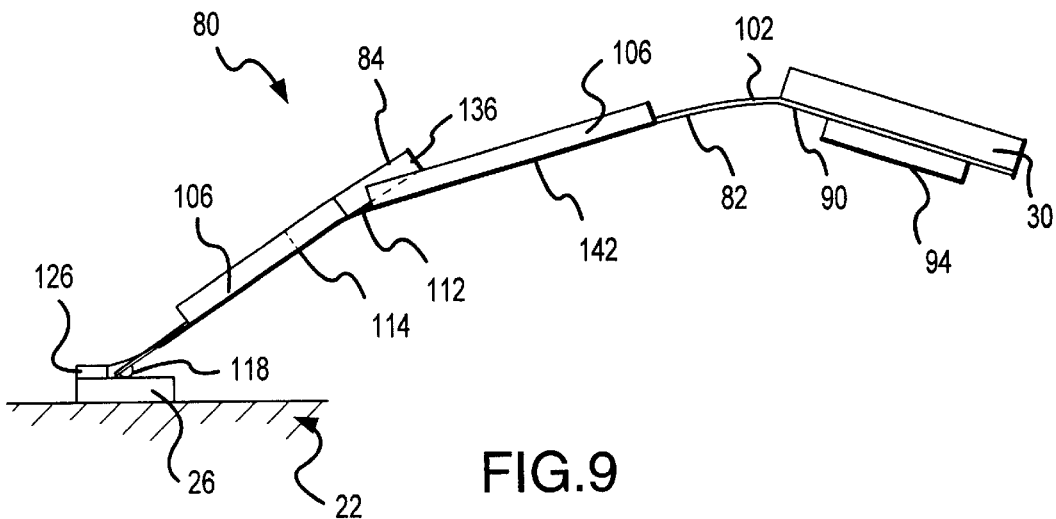
FIG. 9 is an elevated side view similar to FIG. 8 illustrating the actuator arm undergoing an upward excursion, with an exaggerated vertical scale, as a result of a shock event and further illustrating the locking hinge suspension in an unlocked position to maintain contact between the slider and the disc surface.

FIG. 9 illustrates a shock event applied to the suspension 80 shown in FIG. 8 where the actuator arm 30 of the E-block 52 has been deflected upward (either on the initial shock or on the rebound from the initial shock). The upward movement of the actuator arm 30 tends to pull the proximal portion 142 of the load beam 82 upwards away from the surface 58 of the disc 22. This upward movement of the proximal portion 142 tends to reduce the preload force applied by the first bend region 102 to the distal end 117 of the load beam 82. Once the preload force applied by the first bend region 102 falls below that of the second bend region 112, the second bend region 112 "unlocks" the distal portion 114 of the load beam from the proximal portion 142 and directs the distal portion 114 of the load beam 82 downward toward the disc 22. Of course, as with FIG. 7, the vertical scale of FIG. 9 has been greatly exaggerated to illustrate the relative movement of the different portions of the suspension 80.

The unlocked hinge in FIG. 9 thus decouples the mass of the proximal portion 142 of the load beam 82 from the distal portion 114 and the attached gimbal 84 and slider 26. FIG. 4 illustrates the magnitude of the mass reduction in relation to prior art suspensions when one compares the mass of the proximal portion 142 of the load beam 82 (which is effectively eliminated during a shock event) to the extra mass added by the gimbal 84 (i.e., the mass of the bridge 130 and the extension 132). The remaining mass of the gimbal 84 (i.e., the distal portion 120) and the slider 26 is approximately the same with both the suspension 80 of the present invention and prior art suspensions such as the suspension 32 in FIG. 3. This effective reduction in the mass that is rigidly attached to the slider 26 reduces the force applied to the slider 26 during a shock event and helps to maintain the slider 26 in contact with the disc surface 58 as shown in FIG. 9.

Modeling suggests that the shock threshold required to produce a "head slap" with the suspension 80 shown in FIGS. 4–9 is approximately 400 Gs, thereby representing a vast improvement over the approximate 200 G shock threshold for the prior art suspension 32 (FIG. 3). Furthermore, it is significant that this increase in the shock threshold was not achieved by shortening the suspension 80 which can lead to undesirable variations in the preload force applied by the first bend region 102, as described above. Additionally, the suspension 80 adds no additional components and few additional manufacturing steps to the assembly of the disc drive 20. Rather, the locking hinge shock absorption effect is achieved primarily by changing the design of the load beam 82 and the gimbal 84.

Figure 10:
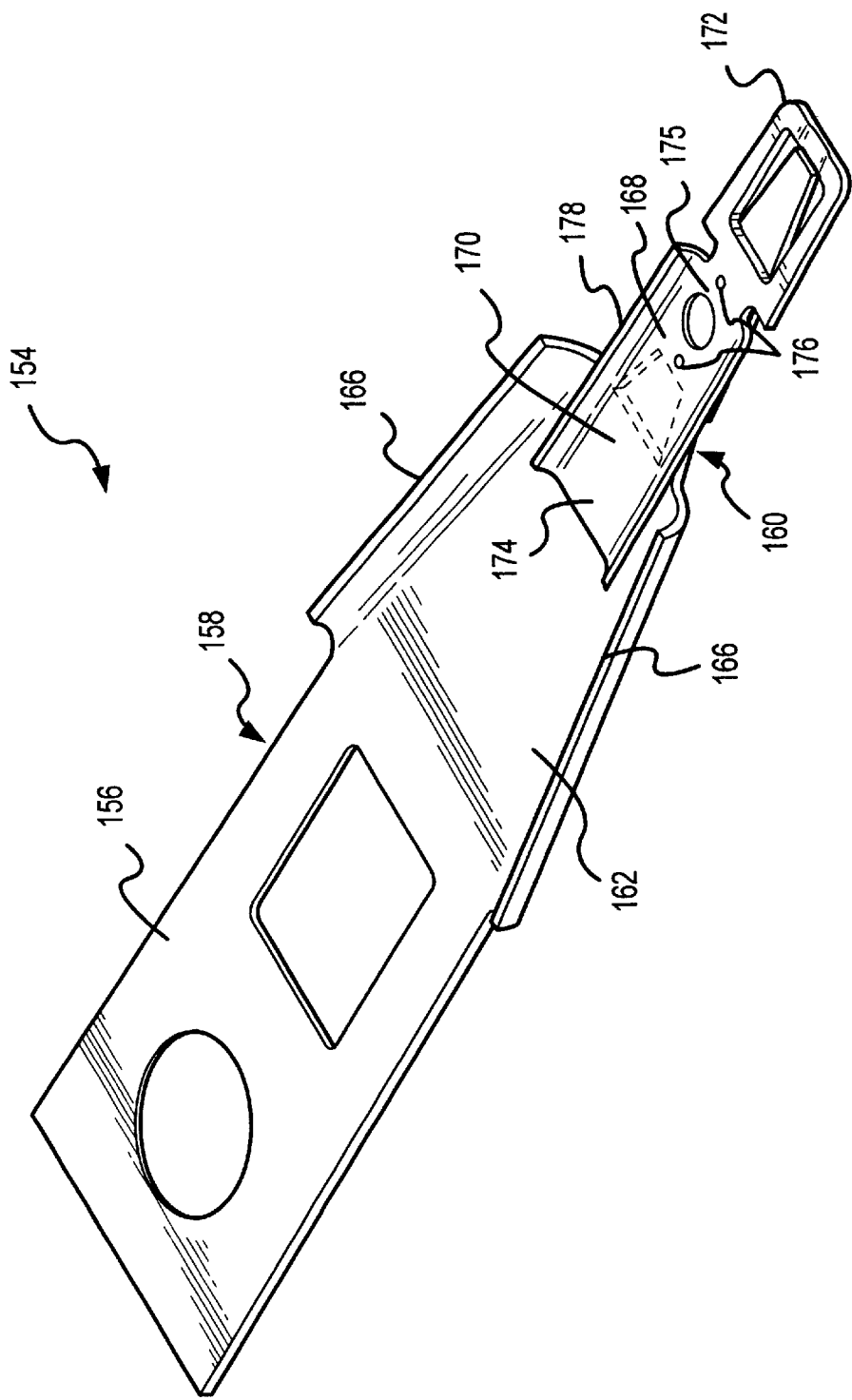
FIG. 10 is an isometric view of a locking hinge suspension in accordance with an alternative preferred embodiment of the present invention.
Figure 11:
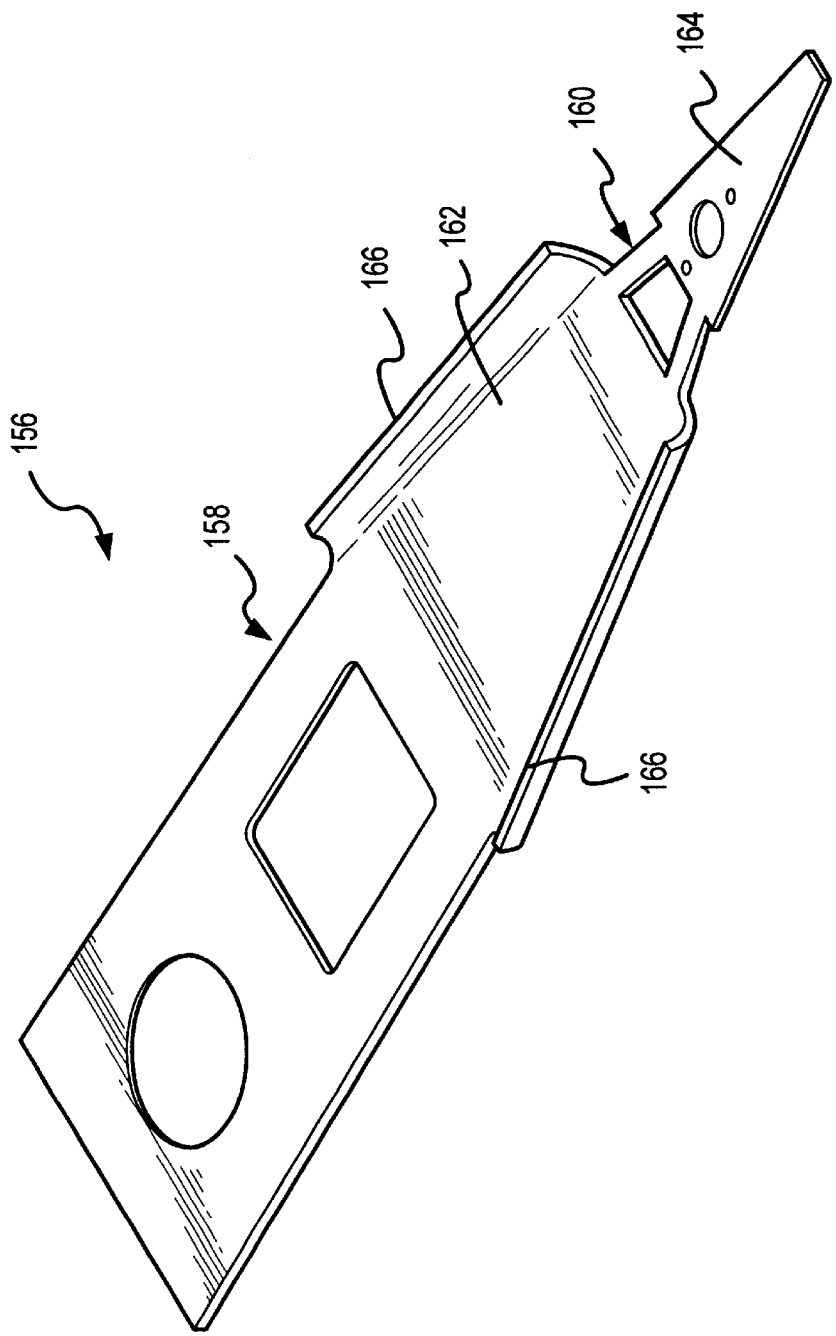
FIG. 11 is an isometric view of a load beam of the locking hinge suspension shown in FIG. 10.
Figure 12:
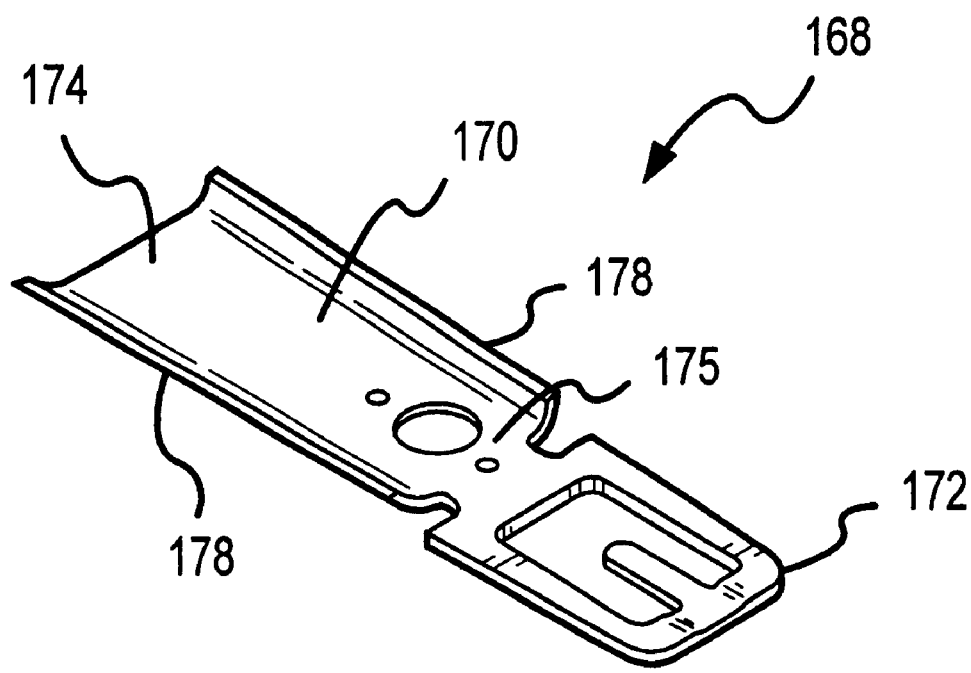
FIG. 12 is an isometric view of a gimbal of the locking hinge suspension shown in FIG. 10.

FIGS. 10–12 illustrate another embodiment of a locking hinge suspension 154 of the present invention. The suspension 154 (FIG. 10) includes a load beam 156 (FIG. 11) having a first bend region 158 and a second bend region 160 similar to the load beam 82 shown in FIG. 5. The first and second bend regions 158 and 160 define proximal and distal portions 162 and 164, respectively, of the load beam 156. The load beam 156 also includes a pair of stiffening rails 166 which extend along the sides of the proximal portion 162 and terminate prior to the second bend region 160. The stiffening rails 166 do not continue along the distal portion 164 of the load beam 156. Rather, the distal portion 164 comprises an essentially flat metal sheet which is stiffened in the vertical direction by the attachment of a gimbal 168, as described below. Thus, the load beam 156 differs from the first embodiment of the load beam 82 (FIG. 5) that utilizes stiffening rails 106 along both the proximal and distal portions 142 and 114, respectively, of the load beam 82.

The gimbal 168 (FIG. 12) includes an overlapping portion 170 and a distal portion 172. The distal portion 172 is similar to the distal portion 120 (FIG. 6) of the gimbal 84 described above. However, due to the lack of any stiffening rails along the distal portion 164 of the load beam 156, the gimbal 168 (FIG. 12) may overlap the sides of the distal portion 164 when the gimbal 168 and load beam 156 are attached as shown in FIG. 10. The overlapping portion 170 includes a proximal end 174 that extends between the ends of the stiffening rails 166 of the load beam 156 and overlaps the second bend region 160 as shown in FIG. 12. A distal end 175 (FIG. 10) of the overlapping portion 170 connects the distal portion 172 of the gimbal 168. The distal end 175 is preferably attached to the distal portion 164 of the load beam 156 such as at weld spots 176. In this manner, the gimbal 168 performs the same locking hinge function as the gimbal 84 (FIG. 6) described above.

The gimbal 168 further includes a pair of stiffening rails 178 (FIG. 12) along the sides of the overlapping portion 170. The stiffening rails 178 extend from the proximal end 174 to the distal end 175 of the overlapping portion 170, as shown in FIGS. 10 and 12. The rails 178 stiffen not only the gimbal 168 in the vertical direction but also the distal portion 164 of the load beam 156 once the gimbal 168 and load beam 156 are welded together as describe above. Moving the stiffening rails from the distal portion of the load beam (such as in FIG. 5) to the overlapping portion 170 of the gimbal 168 (such as in FIG. 10) further reduces the mass that is rigidly attached to the slider 26 (i.e., the mass distal to the second bend region 160) due to the reduced thickness of the metal gimbal 168 in relation to the metal load beam 156. The reduced mass of the combined distal portion 164 and gimbal 168 of the suspension 154 (FIG. 10) results in a higher shock threshold or tolerance in comparison to the suspension 80 (FIG. 4).

Figure 13:
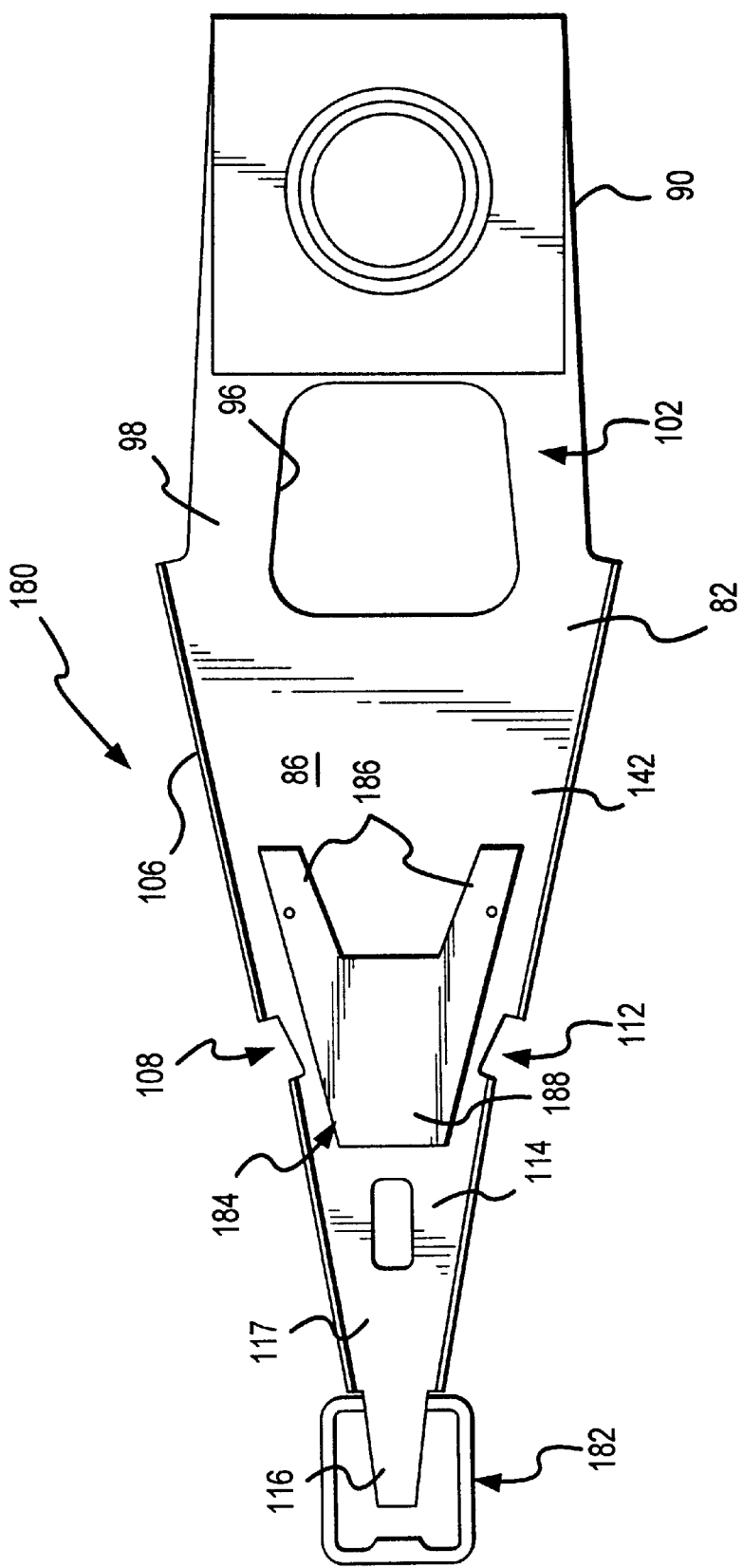
FIG. 13 is a top plan of a locking hinge suspension in accordance with an alternative preferred embodiment of the present invention.
Figure 14:
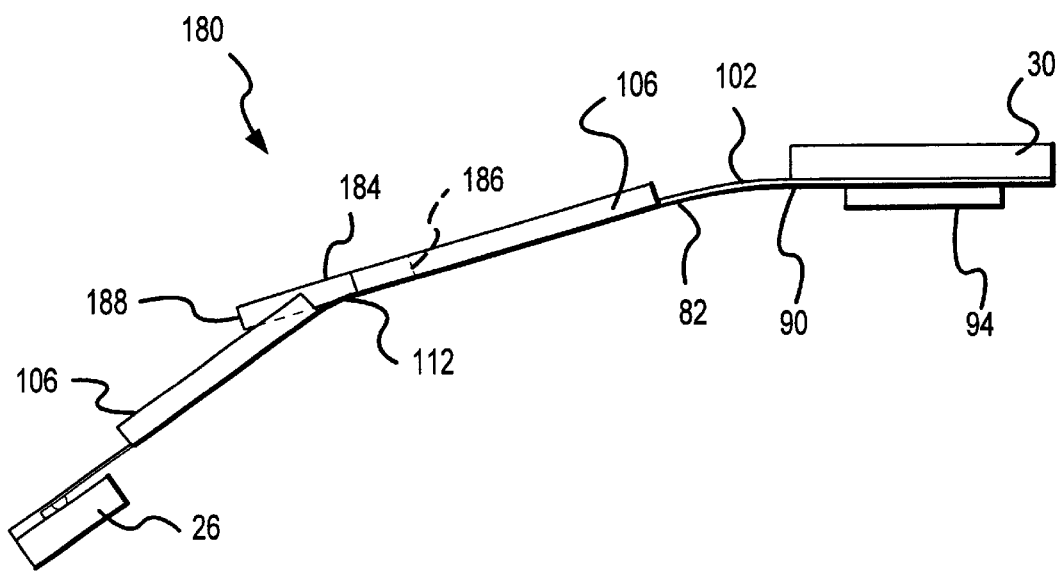
FIG. 14 is an elevated side view of the locking hinge suspension shown in FIG. 13 attached to an actuator arm of the disc drive shown in FIG. 1 illustrating an unloaded position of the locking hinge suspension with an exaggerated vertical scale.

FIGS. 13 and 14 illustrate another embodiment of a locking hinge suspension 180 of the present invention. The suspension 180 is similar to the suspension 80 (FIG. 4) in that it includes the same load beam 82 having the two bend regions 102 and 112. However, rather than utilizing an extended gimbal such as the gimbal 84 (FIG. 6), the suspension 180 preferably utilizes two separate elements including a more conventional gimbal 182 (similar to the prior art gimbal 36 in FIG. 3) and an overlapping member 184 attached to the proximal portion 142 of the load beam 82 as shown in FIG. 13. Alternatively, manufacturers may combine the overlapping member 184 with an integrated suspension (not shown) where the load beam and gimbal are formed from a single metal sheet (rather than two separate elements welded together) and the overlapping member 184 is welded atop the single sheet of the integrated suspension.

The overlapping member 184 is preferably shaped as shown in FIG. 13 with two legs 186 welded to the top surface 86 of the load beam 82 and a distal end 188 extending out over the second bend region 112 to contact the distal portion 114 of the load beam 82 when the suspension 180 is in a loaded condition. In this manner, the overlapping member 184 performs the locking function of the locking hinge suspension 180.

The specific shape of the overlapping member 184 is not important provided the member 184 is anchored to the proximal portion 142 of the load beam and overhangs both the second bend region 112 and the distal portion 114 of the load beam 82. In this manner, the mass of the overlapping member 184 is not coupled directly to the distal portion 114 and the slider 26 when the suspension 180 is in an unloaded position (FIG. 14) or when the loaded suspension 180 encounters a shock event. Thus, in relation to the first embodiment of the suspension 80 (FIG. 4), the suspension 180 (FIG. 13) further reduces the mass connected to the slider 26 by reducing the mass of the gimbal 182 (FIG. 13) in relation to the mass of the gimbal 84 (FIG. 4). While this reduced mass translates to a higher shock threshold or tolerance in comparison to the suspension 80 (FIG. 4), the suspension 180 (FIG. 13) requires additional components (i.e., the overlapping member 184) and manufacturing steps during the assembly of the disc drive 20.

Regardless of which particular suspension is utilized, the suspensions 80, 154 and 180 provide a dramatic increase in shock protection over prior art suspensions that utilize only a single bend region. By using two bend regions in combination with an overlapping member to lock the joint, the suspensions 80, 154 and 180 effectively decouple the slider 26 from the majority of the load beam mass during shock events while ensuring a rigid coupling during normal operation of the disc drive 20.

It is understood that the location of the second bend region along the load beams shown in FIGS. 4–14 represents only one preferred embodiment of the present invention and that additional increases in the shock threshold may be achieved by moving the location of the second bend region closer to the slider 26. That is, a greater percentage of the mass of the load beam will typically be decoupled from the slider 26 as the second bend region is moved closer to the slider 26. Furthermore, although only two bend regions (e.g., 102 and 112 or 158 and 160) are shown in FIGS. 4–14, it is understood that additional bend regions (not shown) may be utilized together with additional overlapping members (not shown) to further enhance the shock absorption properties of the suspension.

It is also understood that the extended gimbals 84 (FIG. 4) and 168 (FIG. 12) and the overlapping member 184 (FIG. 13) represent only three possible means for locking the hinge created by the second bend region. Other features, such as integrally formed features on either the load beam or the gimbal, may also be used to provide the locking effect. Additionally, where an integral suspension (not shown) having both a load beam and a gimbal formed from a single metal sheet is used in place of a separate load beam and gimbal attached together, the integral suspension may include integral features to form the locking hinge—such as extensions from stiffening rails oriented to overlap the second bend region and contact the load beam—as opposed to a welding a separate overlapping element atop the load beam. Of course, integral locking hinge features could also be used with two-part suspensions having a separate load beam and gimbal as described above.

In summary, one preferred embodiment exemplary of the invention and disclosed herein is directed to a suspension (such as 80, 154 or 180) for connecting a slider (such as 26) to an actuator arm (such as 30) of a disc drive (such as 20). The suspension includes a load beam (such as 82 or 156) defining a first bend region (such as 102 or 158) adjacent a proximal end (such as 90) of the load beam and a second bend region (such as 112 or 160) adjacent a distal end (such as 117) of the load beam. An overlapping member (such as 84, 168 or 184) has a first segment (such as 134, 175 or 186) fixed to the load beam (such as 82 or 156) on one side of the second bend region (such as 112 or 160) and a second segment (such as 136, 174 or 188) extending over the second bend region (such as 112 or 160) to releasably engage the load beam on an opposite side of the second bend region when the distal end (such as 117) of the load beam (such as 82 or 156) is placed under a load that is greater than a predetermined operating load.

In another preferred embodiment of the present invention, the load beam (such as 82) includes vertical stiffening rails (such as 106) extending distally from the first bend region (such as 102), and the second bend region (such as 112) is defined at a gap (such as 108) in the vertical stiffening rails (such as 106).

In another preferred embodiment of the present invention, the suspension (such as 80, 154 or 180) is adapted to maintain the slider (such as 26) substantially engaged with a disc surface (such as 58) positioned below the suspension, and the overlapping member (such as 84, 168 or 184) is attached to a top surface (such as 86) of the load beam (such as 82 or 156).

In another preferred embodiment of the present invention, the first segment (such as 134 or 175) of the overlapping member (such as 84 or 168) is fixed to a distal portion (such as 114 or 164) of the load beam (such as 82 or 156) so that the second segment (such as 136 or 174) of the overlapping member (such as 84 or 168) releasably engages a proximal portion (such as 142 or 162) of the load beam between the first bend region (such as 102 or 158) and the second bend region (such as 112 or 160).

In another preferred embodiment of the present invention, the overlapping member comprises a gimbal (such as 84 or 168) adapted to be attached to a slider (such as 26).

In another preferred embodiment of the present invention, the gimbal (such as 84 or 168) includes a distal portion (such as 120 or 172) protruding beyond the distal end (such as 117) of the load beam (such as 82 or 156). The gimbal (such as 84 or 168) also includes an extension (such as 132 or 170) extending proximally from the distal portion (such as 120 or 172) and defining the first segment (such as 134 or 175) and the second segment (such as 136 or 174) of the overlapping member.

In another preferred embodiment of the present invention, the second segment comprises a pair of arms (such as 136) for contacting opposing sides of the proximal portion (such as 142) of the load beam (such as 82).

In another preferred embodiment of the present invention, the load beam (such as 82) is formed from a metal sheet having a thickness of approximately 2.5 mils, the gimbal (such as 84) is formed from a metal sheet having a thickness of approximately 0.5 mils, and the first and second segments (such as 134 and 136) include vertical stiffening rails (such as 146).

In another preferred embodiment of the present invention, the gimbal extension (such as 170) includes stiffening rails (such as 178) extending along the first segment (such as 175) and the second segment (such as 174), and the load beam (such as 156) includes stiffening rails (such as 166) extending between the first bend region (such as 158) and the second bend region (such as 160).

In another preferred embodiment of the present invention, the first segment (such as 186) of the overlapping member (such as 184) is fixed to a proximal portion (such as 142) of the load beam (such as 82) between the first bend region (such as 102) and the second bend region (such as 112) so that the second segment (such as 188) of the overlapping member (such as 184) releasably engages a distal portion (such as 114) of the load beam (such as 82).

In another preferred embodiment of the present invention, a gimbal (such as 182) is fixed to the distal end (such as 117) of the load beam (such as 82).

A further exemplary preferred embodiment of the present invention includes a disc drive assembly (such as 20) having at least one disc (such as 22) mounted on a hub (such as 24) for rotation about a spindle shaft (such as 25), the disc (such as 22) having a surface (such as 58) for recording data, and the disc drive assembly (such as 20) further including an actuator (such as 28) for moving an actuator arm (such as 30) above the surface (such as 58) of the disc (such as 22). A suspension (such as 80, 154 or 180) connects a slider (such as 26) to the actuator arm (such as 30) to maintain the slider (such as 26) substantially engaged with the disc surface (such as 58). The slider (such as 26) includes a transducer for reading and writing data to the disc surface (such as 58). The suspension (such as 80, 154 or 180) includes a load beam (such as 82 or 156) having a proximal end (such as 90) attached to the actuator arm (such as 30) and a distal end (such as 117) engaging the slider (such as 26). The load beam (such as 82 or 156) defines a first bend region (such as 102 or 158) adjacent the proximal end (such as 90) and a second bend region (such as 112 or 160) adjacent the distal end (such as 117) of the load beam. An overlapping member (such as 84, 168 or 184) has a first segment (such as 134, 175 or 186) fixed to the load beam (such as 82 or 156) on one side of the second bend region (such as 112 or 160) and a second segment (such as 136, 174 or 188) extending over the second bend region (such as 112 or 160) to releasably engage the load beam (such as 82) on an opposite side of the second bend region when the distal end (such as 117) of the load beam (such as 82 or 156) is placed under a load that is greater than a predetermined operating load.

In another preferred embodiment of the present invention, the first segment (such as 134 or 175) of the overlapping member (such as 84 or 168) is fixed to a distal portion (such as 114 or 164) of the load beam (such as 82 or 156) so that the second segment (such as 136 or 174) of the overlapping member (such as 84 or 168) releasably engages a proximal portion (such as 142 or 162) of the load beam between the first bend region (such as 102 or 158) and the second bend region (such as 112 or 160).

In another preferred embodiment of the present invention, the overlapping member further comprises a gimbal (such as 84 or 168) having a distal portion (such as 120 or 172) fixed to the slider (such as 26).

In another preferred embodiment of the present invention, a gimbal (such as 182) is fixes the distal end (such as 117) of the load beam (such as 82) to a top surface (such as 48) of the slider (such as 26).

A further exemplary preferred embodiment of the present invention includes a suspension (such as 80, 154 or 180) for connecting a slider (such as 26) to an actuator arm (such as 30) of a disc drive (such as 20). The suspension includes a load beam (such as 82 or 156) defining a first bend region (such as 102 or 158) and a second bend region (such as 112 or 160), a proximal portion (such as 142 or 162) between the first and second bend regions, and a distal portion (such as 114 or 164) distal to the second bend region (such as 112 or 160). The first and second bend regions are preloaded to urge the distal portion (such as 114 or 164) downward in relation to a top surface (such as 86) of the load beam (such as 82 or 156), the preload force of the first bend region (such as 102 or 158) being greater than the preload force of the second bend region (such as 112 or 160). An overlapping member (such as 84, 168 or 184) has a first segment (such as 134, 175 or 186) fixed to the top surface (such as 86) of the load beam (such as 82 or 156) on one side of the second bend region (such as 112 or 160) and a second segment (such as 136, 174 or 188) extending over the second bend region (such as 112 or 160) to releasably engage the top surface of the load beam on an opposite side of the second bend region when the distal end (such as 117) of the load beam (such as 82 or 156) is placed under a load that is greater than the preload force provided by the second bend region.

A further exemplary preferred embodiment of the present invention includes a suspension assembly (such as 80, 154 or 180) for connecting a slider (such as 26) within a disc drive (such as 20). The suspension incorporates a load beam (such as 82 or 156) having a distal end (such as 117) adapted to attach the slider (such as 26) and a bend region (such as 102 or 158) urging the distal end downward in relation to a top surface (such as 86) of the load beam (such as 82 or 156). The load beam further includes an intermediate locking hinge positioned between the bend region (such as 102 or 158) and the distal end (such as 117) for substantially isolating the distal end from upward movement of the load beam.

A further exemplary preferred embodiment of the present invention includes a disc drive assembly (such as 20) having a slider (such as 26) engaging a surface (such as 58) of a disc (such as 22) and means for increasing a shock threshold required to separate the slider (such as 26) from the disc surface (such as 58).

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A suspension for connecting a slider to an actuator arm of a disc drive, the suspension comprising:
   a load beam defining a first bend region adjacent a proximal end of the load beam and a second bend region adjacent a distal end of the load beam; and
   an overlapping member having a first segment fixed to the load beam on one side of the second bend region, the overlapping member having a second segment extending over the second bend region to releasably engage the load beam on an opposite side of the second bend region when the distal end of the load beam is placed under a predetermined operating load.

2. A suspension as defined in claim 1, wherein:
   the load beam includes vertical stiffening rails extending distally from the first bend region; and
   the second bend region is defined at a gap in the vertical stiffening rails.

3. A suspension as defined in claim 1, wherein the suspension is adapted to maintain the slider substantially engaged with a disc surface positioned below the suspension, and wherein:
   the overlapping member is attached to a top surface of the load beam.

4. A suspension as defined in claim 3, wherein the first segment of the overlapping member is fixed to a distal portion of the load beam so that the second segment of the overlapping member releasably engages a proximal portion of the load beam between the first and second bend regions.

5. A suspension as defined in claim 4, wherein the overlapping member further comprises a gimbal adapted to attach the slider.

6. A suspension as defined in claim 5, wherein the gimbal includes:
   a distal portion protruding beyond the distal end of the load beam for attaching the slider; and
   an extension extending proximally from the distal portion, the extension defining the first and second segments of the overlapping member.

7. A suspension as defined in claim 6, wherein the second segment comprises a pair of arms for contacting opposing sides of the proximal portion of the load beam.

8. A suspension as defined in claim 6, wherein:
   the load beam is formed from a metal sheet having a thickness of approximately 2.5 mils;
   the gimbal is formed from a metal sheet having a thickness of approximately 0.5 mils; and
   the first and second segments include vertical stiffening rails.

9. A suspension as defined in claim 6 wherein:
   the gimbal extension includes vertical stiffening rails extending along the first and second segments.

10. A suspension as defined in claim 3, wherein the first segment of the overlapping member is fixed to a proximal portion of the load beam between the first and second bend regions so that the second segment of the overlapping member releasably engages a distal portion of the load beam.

11. A suspension as defined in claim 10, further comprising:
    a gimbal fixed to the distal end of the load beam for attaching the slider.

12. A disc drive assembly having at least one disc mounted on a hub for rotation about a spindle shaft, the disc having a surface for recording data, the disc drive assembly further including an actuator for moving an actuator arm above the surface of the disc, and a suspension connecting a slider to the actuator arm to maintain the slider substantially engaged with the disc surface, the slider including a transducer for reading and writing data to the disc surface, and wherein the suspension comprises:
    a load beam having a proximal end attached to the actuator arm and a distal end engaging the slider, the load beam defining a first bend region adjacent the proximal end and a second bend region adjacent the distal end of the load beam; and
    an overlapping member having a first segment fixed to the load beam on one side of the second bend region, the overlapping member having a second segment extending over the second bend region to releasably engage the load beam on an opposite side of the second bend region when the distal end of the load beam is placed under a predetermined operating load.

13. A disc drive assembly as defined in claim 12, wherein the first segment of the overlapping member is fixed to a distal portion of the load beam so that the second segment of the overlapping member releasably engages a proximal portion of the load beam between the first and second bend regions.

14. A disc drive assembly as defined in claim 13, wherein the overlapping member further comprises a gimbal having a distal portion fixed to the slider.

15. A disc drive assembly as defined in claim 14, wherein:

the load beam is formed from a metal sheet having a thickness of approximately 2.5 mils;

the gimbal is formed from a metal sheet having a thickness of approximately 0.5 mils; and the first and second segments include vertical stiffening rails.

16. A disc drive assembly as defined in claim 14 wherein:

the first and second segments include vertical stiffening rails; and the load beam includes vertical stiffening rails extending between the first and second bend regions.

17. A disc drive assembly as defined in claim 12, wherein the first segment of the overlapping member is fixed to a proximal portion of the load beam between the first and second bend regions so that the second segment of the overlapping member releasably engages a distal portion of the load beam.

18. A disc drive assembly as defined in claim 17, further comprising:

a gimbal fixing the distal end of the load beam to a top surface of the slider.

19. A suspension for connecting a slider to an actuator arm of a disc drive, the suspension comprising:

a load beam defining first and second bend regions, a proximal portion between the first and second bend regions, and a distal portion distal to the second bend region, the first and second bend regions being preloaded to urge the distal portion downward in relation to a top surface of the load beam, the preload force of the first bend region being larger than the preload force of the second bend region; and an overlapping member having a first segment fixed to the top surface of the load beam on one side of the second bend region, the overlapping member having a second segment extending over the second bend region to releasably engage the top surface of the load beam on an opposite side of the second bend region when the distal end of the load beam is placed under a load that is greater than the preload force provided by the second bend region.

20. A suspension as defined in claim 19, wherein:

the overlapping member comprises a gimbal adapted to attach the slider; and the first segment is fixed to the distal portion of the load beam.

21. A suspension assembly for supporting a slider within a disc drive, the suspension assembly comprising:

a load beam having a distal end adapted to attach the slider and a bend region urging the distal end downward in relation to a top surface of the load beam, the load beam including an intermediate locking hinge positioned between the bend region and the distal end for substantially isolating the distal end from upward movement of the load beam.

22. A disc drive comprising:

a slider engaging a surface of a disc; and means for increasing a shock threshold required to separate the slider from the disc surface.

* * * * *